(12) United States Patent
Walz et al.

(10) Patent No.: US 11,204,053 B2
(45) Date of Patent: Dec. 21, 2021

(54) REAR PANEL CONNECTOR

(71) Applicant: Häfele Berlin GmbH & Co KG, Berlin (DE)

(72) Inventors: Rüdiger Walz, Neustetten-Nellingsheim (DE); Gunter Nitschmann, Pfalzgrafenweiler (DE)

(73) Assignee: HÄFELE BERLIN GMBH & CO KG, Berlin (DE)

( * ) Notice: Subject to any disclaimer, the term of this patent is extended or adjusted under 35 U.S.C. 154(b) by 855 days.

(21) Appl. No.: 15/947,506

(22) Filed: Apr. 6, 2018

(65) Prior Publication Data
US 2018/0291941 A1    Oct. 11, 2018

(30) Foreign Application Priority Data

Apr. 11, 2017 (DE) .................. 20 2017 102 158.0

(51) Int. Cl.
*F16B 12/20* (2006.01)
*F16B 12/46* (2006.01)
*F16B 12/14* (2006.01)
*F16B 5/06* (2006.01)
(Continued)

(52) U.S. Cl.
CPC .............. *F16B 12/20* (2013.01); *F16B 12/14* (2013.01); *F16B 12/46* (2013.01); *F16B 2/04* (2013.01); *F16B 5/0614* (2013.01); *F16B 13/124* (2013.01); *F16B 2012/145* (2013.01)

(58) Field of Classification Search
CPC ........ F16B 5/0614; F16B 5/06; F16B 5/0607; F16B 12/10; F16B 12/12; F16B 12/20; F16B 12/46; F16B 2012/145; Y10T 403/7067
See application file for complete search history.

(56) References Cited

U.S. PATENT DOCUMENTS

| 3,848,388 | A  | * | 11/1974 | Bretche | ................. | F16B 5/0607 |
| | | | | | | 403/362 |
| 9,771,964 | B2 | * | 9/2017 | Leveen | .................... | F16B 19/00 |
| 10,215,214 | B2 | * | 2/2019 | Ligi, Jr. | ................ | F16B 21/086 |

FOREIGN PATENT DOCUMENTS

| AT | 514096 | * | 2/2017 | .............. F16B 12/10 |
| DE | 83 31 968 U1 | | 2/1984 | |
| DE | 20 2008 006 607 U1 | | 10/2009 | |

OTHER PUBLICATIONS

Translation of DE 202008 006 607. worldwide.espacenet.com. Jan. 14, 2021.*

* cited by examiner

*Primary Examiner* — Michael P Ferguson
(74) *Attorney, Agent, or Firm* — Hackler Daghigian Martino & Novak

(57) ABSTRACT

A rear wall/panel connector includes a stud, which has a receiving groove and two walls projecting vertically from the stud on both sides of the receiving groove. The two walls each have an opening configured for screwing in a screw. One of the two walls forms an arm of a rocker which is mounted on the stud wherein it is pivotable between a starting position and an end position about an axis which is parallel or almost parallel to the longitudinal direction of the receiving groove. The inside of the second wall is positioned obliquely outwards with respect to the longitudinal center plane of the receiving groove in the starting position and extends parallel to the longitudinal center plane in the end position. The other rocker arm projects outwards over the stud, at least in the end position.

10 Claims, 4 Drawing Sheets

(51) Int. Cl.
*F16B 13/12* (2006.01)
*F16B 2/04* (2006.01)

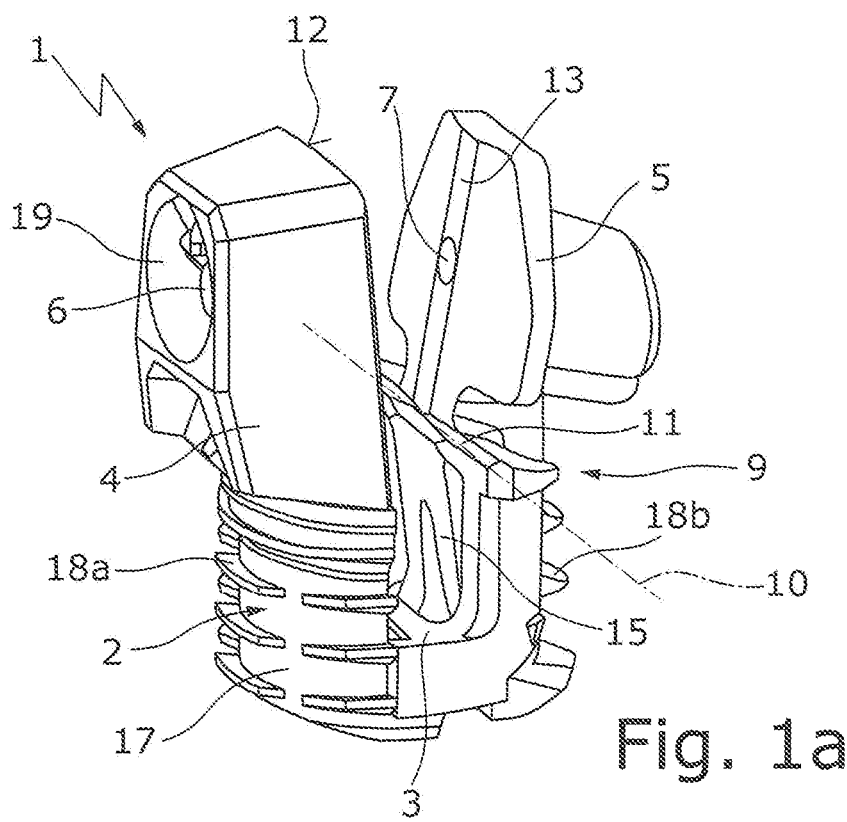
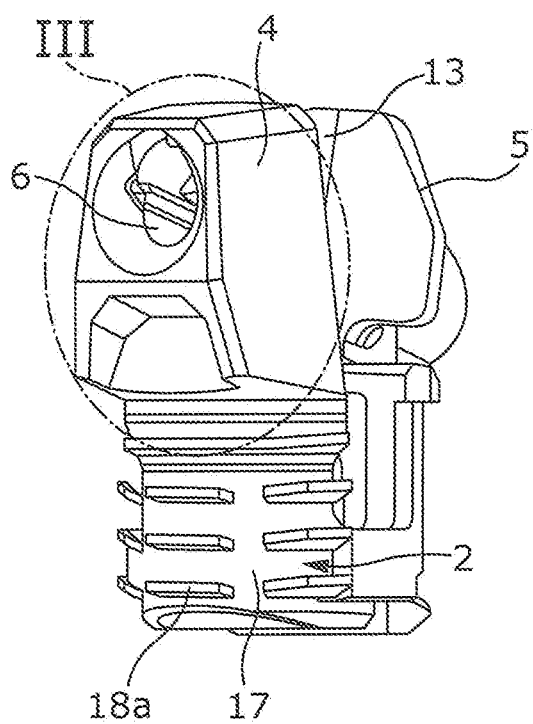 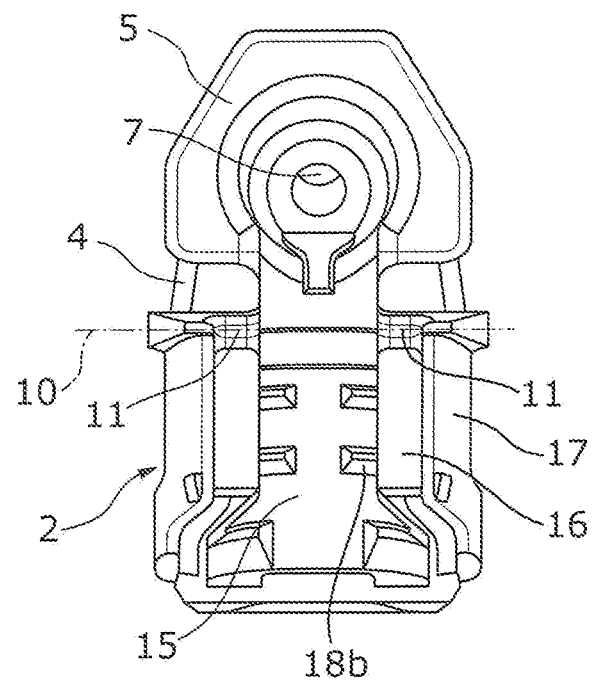
Fig. 1a
Fig. 1b  Fig. 1c

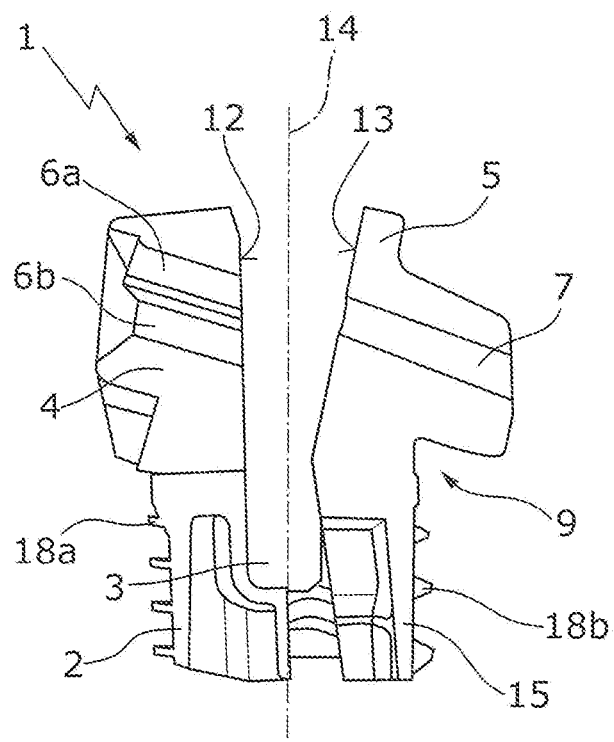
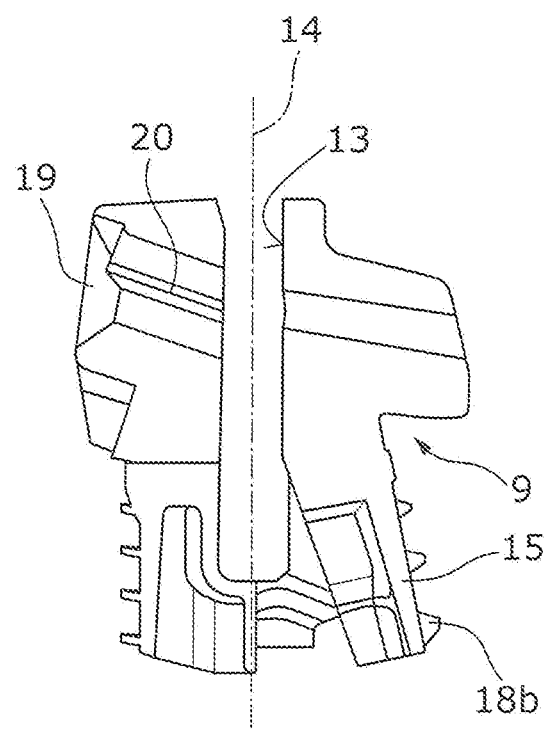
Fig. 2a    Fig. 2b
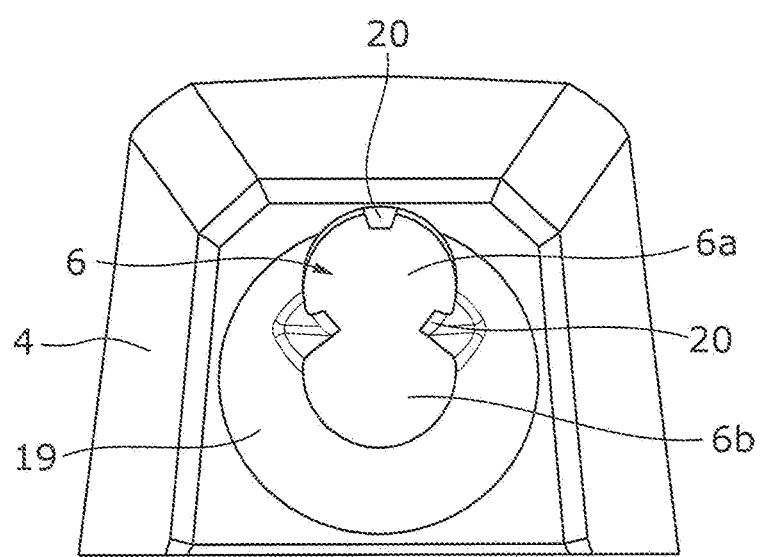
Fig. 3

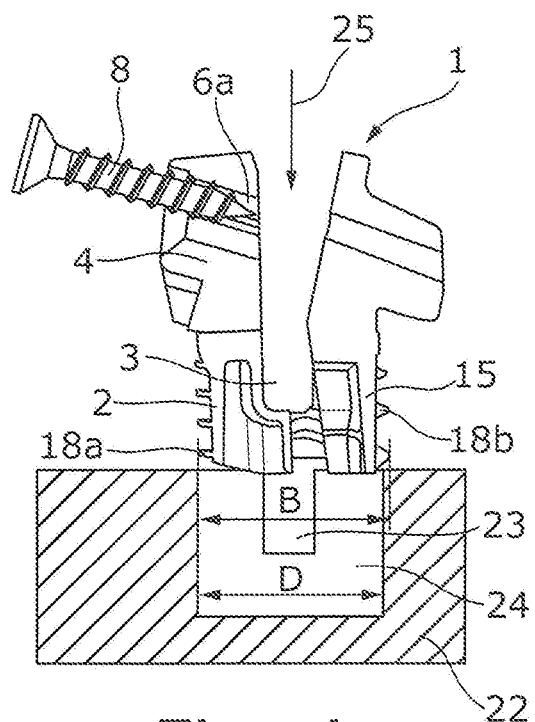
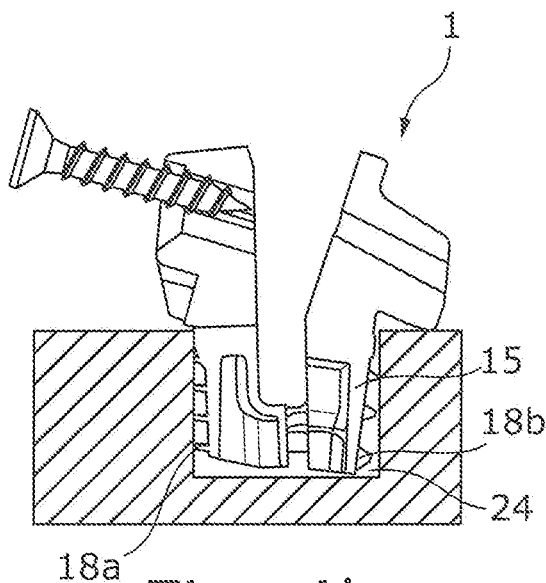
Fig. 4a
Fig. 4b
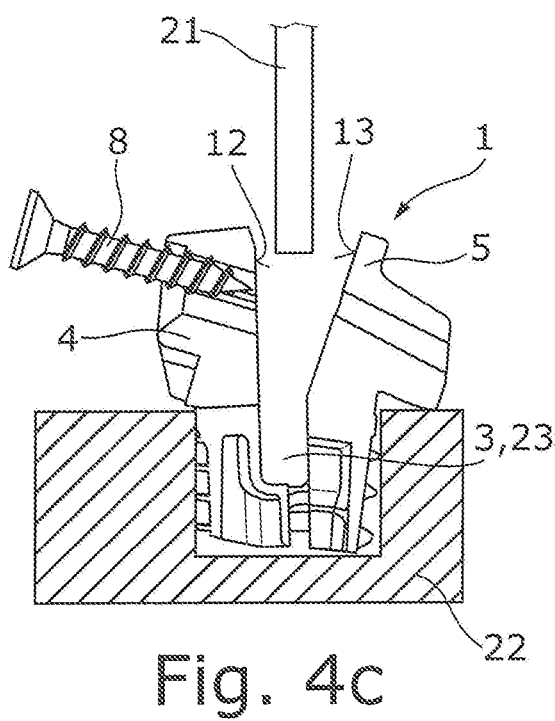
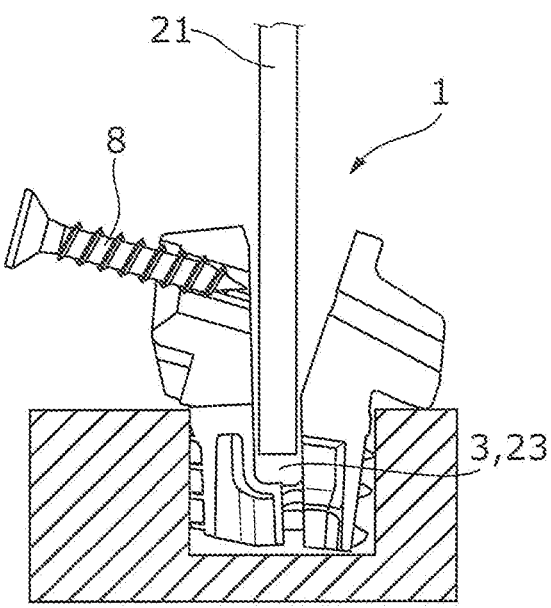
Fig. 4c
Fig. 4d though this
REAR PANEL CONNECTOR

CROSS-REFERENCE TO RELATED APPLICATIONS

This application claims priority to German Utility Model Application No. 20 2017 102 158.0, filed Apr. 11, 2017, the entire contents of which are hereby incorporated by reference.

DESCRIPTION

Field of the Invention

The invention relates to a rear wall connector for fastening a first panel within a groove of a second panel, and an associated panel arrangement.

Background of the Invention

A rear wall/panel connector of this type has become known for example from DE 83 31 968 U1. This known rear wall connector comprises a base having a receiving groove and a wall which projects vertically on one side of the receiving groove and has an opening for screwing in a screw. The rear wall connector is pressed with its base into a bore arranged in the floor groove of a floor panel, wherein the receiving groove of the rear wall connector is flush with the floor groove. A rear wall panel is inserted into the floor groove and the receiving groove and secured by means of a screw which is screwed into the base through the rear wall panel via the opening of the wall. For a gap-free joint appearance, the rear wall panel has to be received in the receiving groove with a precise fit, i.e. the groove width of the receiving groove has to correspond exactly to the panel thickness, which in turn increases the assembly effort considerably when inserting the rear wall panel in the receiving groove. Once pressed into the bore, the rear wall connector can usually no longer be twisted in the bore, although this would be necessary for exact alignment of the receiving groove with respect to the floor groove.

In contrast, the invention is based on the object of providing a rear wall connector which enables gap-free securing of the first panel in the groove of the second panel and can be securely anchored in the second panel such that it is prevented from being pulled out.

SUMMARY OF THE INVENTION

This object is achieved according to the invention by a rear wall/panel connector comprising a stud, which has a receiving groove and two walls projecting vertically from the stud on both sides of the receiving groove, which each have an opening for screwing in a screw, wherein one of the two walls forms the one arm of a rocker which is mounted on the stud such that it is pivotable between a starting position and an end position about an axis which is parallel or almost parallel to the longitudinal direction of the receiving groove, wherein the inside of the one wall is positioned obliquely outwards with respect to the longitudinal center plane of the receiving groove in the starting position and extends parallel to the longitudinal center plane in the end position, and wherein the other rocker arm projects outwards over the stud, at least in the end position.

According to the invention, as a result of screwing a screw into the openings of the two walls, the deflectable second wall is drawn towards the first wall until a rear wall panel inserted into the receiving groove is clamped between the two walls. As a result of the drawing of the second wall towards the first wall, the rocker arm pivots outwards, whereby the stud can be clamped in a bore.

The rocker arm preferably already projects outwards over the stud in the starting position. With the insertion of the rear wall connector into a slightly smaller bore, the rocker arm pivots a corresponding distance inwards against the effect of an elastic restoring force so that the rocker arm which is pre-tensioned in this way prevents the rear wall connector from falling out of the bore.

The other, first wall is preferably rigidly connected to the stud so that a gap-free joint appearance can be achieved on the side of the first wall as a result of the deflectable second wall being drawn towards it.

In a particularly simple manner, the pivot axis of the rocker can be formed by two torsion webs via which the rocker is attached to the stud on both sides.

The angle through which the inside of the second wall is positioned obliquely outwards with respect to the longitudinal center plane of the receiving groove in the starting position is in the range of 10° to 25°, in particular in the range of 15° to 20°. In particular, the maximum deflection of the rocker can be specified via this angle.

The stud and/or the rocker arm particularly preferably each comprise, on their outsides, at least one projection, preferably a plurality of projections, in particular circumferential ribs, e.g. in the form of claws, which can dig into a bore wall. The projections can be formed for example in the manner of barbs.

In a particularly advantageous embodiment, the opening of the first wall is formed by two mutually overlapping openings arranged above one another, in particular in the form of an upper pre-assembly channel and a lower end position channel. A screw which is firstly screwed into the upper opening enters the lower opening when its screw head is deflected downwards at the upper opening edge of the upper opening, whereby the rear wall panel penetrated by the screw is additionally pressed downwards into contact against the bottom of the groove.

The invention also relates to an arrangement comprising two mutually connected panels of which the one, first panel is inserted into a groove of the other, second panel, and a rear wall connector formed as above, which is inserted with its stud into a bore arranged in the groove of the second panel and is deflected into its end position, wherein the first panel, which is inserted into the receiving groove of the rear wall connector, is clamped between the two walls of the rear wall connector and is screwed in place by means of a screw which is screwed through the rear wall panel via the opening of the first wall and into the opening of the second wall.

For furniture manufactures, it is highly advantageous here that the rear wall panel only needs to be sawn, since any drilling operations involve an additional production step on a separate machine. Despite using a screw connection, the manufacture of the rear wall panel is very simple and economical.

Further advantages of the invention are revealed in the description, the claims and the drawing. The features mentioned above and those yet to be described below can likewise be used individually or together in any combinations. The embodiments shown and described should not be seen as a definitive list, but rather as being exemplary in nature for the purpose of describing the invention.

BRIEF DESCRIPTION OF THE DRAWINGS

In the drawings:

FIGS. 1a-1c show various views of a rear wall connector according to the invention;

FIGS. 2a, 2b show the rear wall connector shown in FIG. 1 in its starting position (FIG. 2a) and in its end position (FIG. 2b), each in a longitudinal section;

FIG. 3 an enlarged detailed view according to III in FIG. 1b; and

FIGS. 4a-4h the assembly of the rear wall connector according to the invention.

DETAILED DESCRIPTION OF THE PREFERRED EMBODIMENTS

Figure 4E:
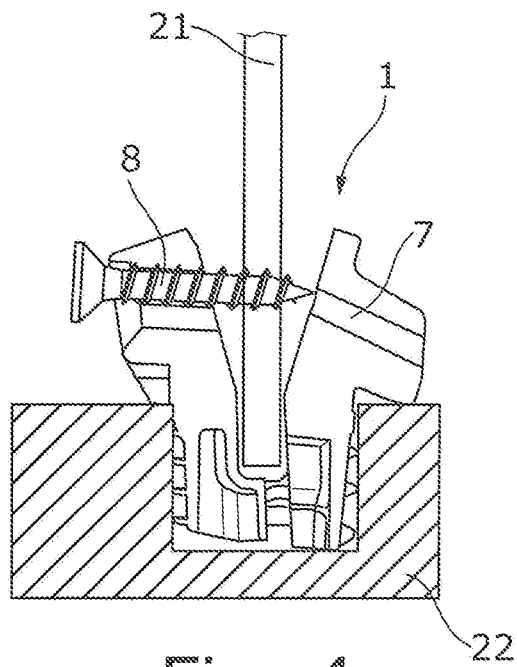

The U-shaped rear wall connector 1 shown in FIGS. 1a-1c serves for fastening a first panel within a groove of a second panel and is formed in one piece, e.g. from plastics material or zinc die-cast metal.

The rear wall connector 1 comprises a cylindrical stud 2 having a receiving groove 3 and two walls 4, 5 projecting vertically from the stud 2 on both sides of the receiving groove 3, which each have an opening 6, 7 for screwing in a screw 8 (FIG. 4). The two walls 4, 5 each adjoin the two groove flanks of the receiving groove 3 in a flush manner, wherein the one, first wall 4 is rigidly connected to the stud 2. The other, second wall 5 forms the one, upper rocker arm of a rocker 9, which is mounted on the stud 2 such that it is pivotable between a starting position (FIG. 2a) and an end position (FIG. 2b) about an axis 10 which is parallel to the longitudinal direction of the receiving groove 3. The pivot axis 10 is formed by torsion webs 11 via which the rocker 9 is connected to the stud 2.

The first wall 4 is rigidly connected to the stud 2 and has a convexly curved inside 12; alternatively, however, the inside 12 can also be formed as a planar contact surface. The inside 13 of the second wall 5 is positioned obliquely outwards through ca. 18° with respect to the longitudinal center plane 14 of the receiving groove 3 and extends parallel to the longitudinal center plane 14 in the end position. The inside 13 of the second wall 5 is convexly formed with a small central rounding and with planar side flanks on both sides; alternatively, however, the inside 13 can also be formed as a planar contact surface. The other, lower rocker arm 15 is arranged in a recess 16 of the cylindrical lateral surface 17 of the stud 2 and projects outwards over the circumferential surface of the stud 2 both in the starting position and in the end position, the projection being slight—e.g. ca. 1 mm—in the starting position and considerably further—e.g. ca. 3 mm—in the end position. The stud 2 and the rocker arm 15 each have a plurality of circumferential ribs in the form of claws 18a, 18b on their outsides.

As shown in FIG. 3, the opening 6 of the first wall 4 is formed by two mutually overlapping openings, namely by an upper pre-assembly channel 6a and a lower end position channel 6b, which are both surrounded on the outside by a cone surface 19 arranged concentrically to the end position channel 6b. Three ribs 20 project inwards into the pre-assembly channel 6a, at an angular spacing of ca. 120° in each case.

The assembly of the rear wall connector 1 for fastening a rear wall panel 21 within a groove 23 of a floor panel 22 is shown in FIGS. 4a-4h.

The self-tapping screw 8 is screwed into the pre-assembly channel 6a, wherein the screw threads cut into the three ribs 20. The rear wall connector 1 having the screw 8 which is pre-assembled in this way is inserted with its stud 2 into a bore 24 (FIGS. 4a, 4b), which is arranged centrally in the groove 23 of the floor panel 22. Since, in the starting position, the width B of the rear wall connector 1, which is defined by the claws 18a, 18b of the stud 2 and the lower rocker arm 15, is greater than the bore diameter D, the lower rocker arm 15 pivots a corresponding distance inwards against the effect of an elastic restoring force during the insertion of the rear-wall connector 1. The lower rocker arm 15 which is pre-tensioned in this way prevents the rear wall connector 1 from falling out of the bore 24 ("secure pre-assembly"). The claws 18a formed on the stud 2 are chamfered in the manner of barbs in the insertion direction 25 and additionally form a resistance against being pulled out, especially since these claws 18a are pressed against the bore wall as a result of the pre-tension of the lower rocker arm 15. The rear wall connector 1 therefore enables simple introduction, but has a high resistance against being pulled out.

The rear wall panel 21 is introduced into the groove 23 of the floor panel 22 and, with this, is simultaneously also introduced into the receiving groove 3 of the rear wall connector 1 (FIGS. 4c, 4d). Owing to its obliquely positioned inside 13, the second wall 5, together with the inside 12 of the first wall 4, forms an introduction aid for the rear wall panel 21.

Figure 4F:
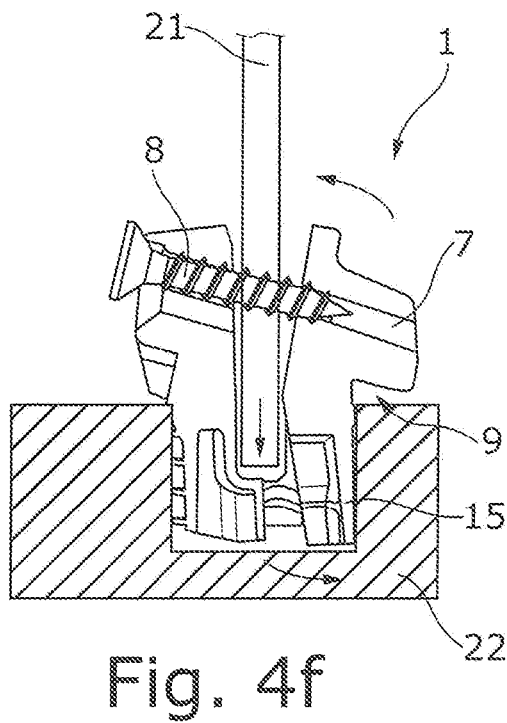

The screw 8 is now screwed through the undrilled rear wall panel 21 with the aid of its self-tapping property (FIG. 4e). After being screwed through, the screw 8 enters the opening, formed as a screw channel 7, of the second wall 5 and is screwed further into the screw channel. The upper rocker arm, i.e. the second wall 4, is thus drawn towards the rear wall panel 21 so that the rocker 9 begins to pivot anti-clockwise and the lower rocker arm 15 begins to dig with its claws 18b into the bore wall (FIG. 4f).

Figure 4G:
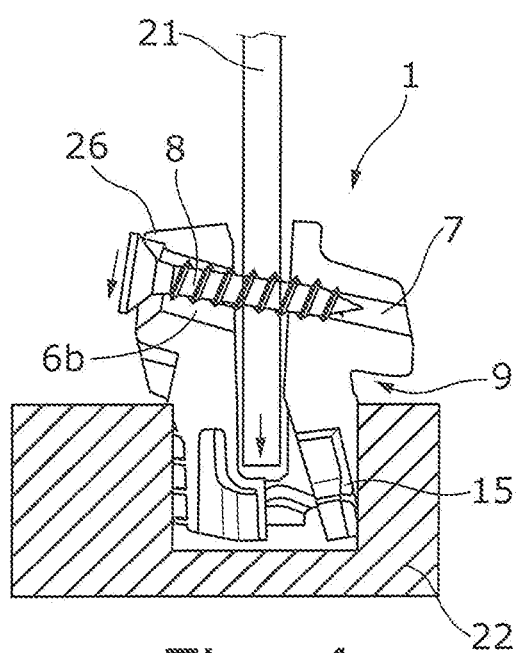
Figure 4H:
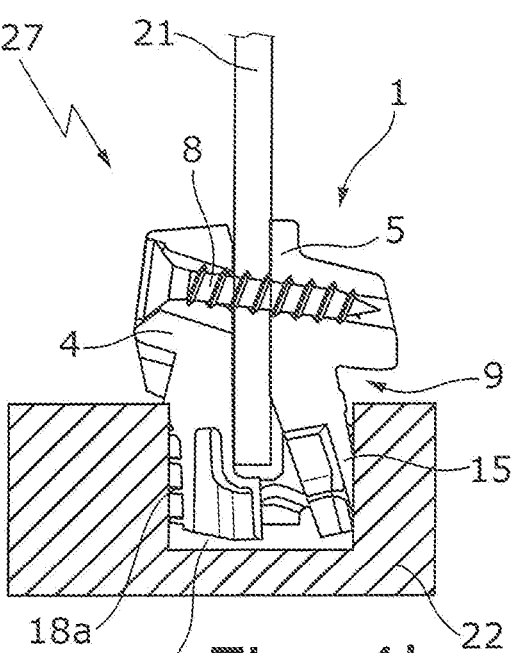

If the screw 8 with its conical countersunk head runs onto the upper opening edge 26 of the pre-assembly channel 6a, the screw 8 is deflected downwards into the end position channel 6b and the rear wall panel 21 is thus also drawn somewhat downwards (FIG. 4g). A bracing of the rear wall panel 21 in the receiving groove 3 therefore takes place in the direction of the bottom of the groove on both sides, i.e. the rear wall panel 21 is tensioned. This prevents the rear wall panel 21 from bulging and results in an altogether better stability and visual appearance of the panel arrangement 27. The tensioning effect in the direction of the bottom of the groove is likewise effective in preventing the side walls from bulging in the case of tall cabinets without a structural shelf (e.g. in the case of a wardrobe which only has a clothes rail).

If the screw 8 is tightened and abuts with its countersunk head against the cone surface 19, the inside 13 of the second wall 5 is drawn completely into contact against the rear wall panel 21 on the one hand, and the lower rocker arm 15 is deflected outwards into its end position on the other. The rear wall panel 21 is clamped and screwed between the two walls 4, 5 of the rear wall connector 1 and is also drawn downwards (braced). The claws 18a, 18b engage in the bore wall and therefore secure the rear wall connector 1 in the bore 24, whereby a stable connection is produced.

The rear wall connector 1 is particularly suitable for large cabinets which are built upright, since the assembly (screwing) of the rear wall connector 1 then takes place from the inside (i.e. from the front of the cabinet). As a result of the second wall 5 being drawn towards the first wall 4, the rear wall panel 21 is moreover drawn forwards, whereby a gap-free joint appearance is produced on the inside of the cabinet.

What is claimed is:

1. A rear wall connector, comprising:
   a stud, which has a receiving groove and two walls projecting vertically from the stud on both sides of the receiving groove, which each have an opening configured for screwing in a screw;
   wherein the two walls comprise a first wall opposite a second wall separated by the receiving groove;
   wherein the first wall is rigidly connected to the stud and projects vertically from the stud on a first side of the receiving groove;
   wherein the second wall is on a second side of the receiving groove;
   wherein a double-armed rocker having a lower rocker arm and an upper rocker arm is pivotably attached to the stud about a pivot axis which extends transverse to a longitudinal axis of the stud, wherein the pivot axis is located between the upper rocker arm and lower rocker arm and is formed by two torsion webs via which the double-armed rocker is attached to the stud on both sides;
   wherein the double-armed rocker is pivotable between a starting position and an end position about the pivot axis, the pivot axis being parallel or almost parallel to the longitudinal direction of the receiving groove;
   wherein the lower rocker arm is arranged in a recess of a lateral-surface wall of the stud and the upper rocker arm forms the second wall;
   wherein the inside of the upper rocker arm is positioned obliquely outwards with respect to a longitudinal center plane of the receiving groove in the starting position and extends parallel to the longitudinal center plane in the end position; and
   wherein an outside of the lower rocker arm is aligned with an outside of the stud in the starting positon and wherein the outside of the lower rocker arm is tilted outwards with respect to the stud and projects outwards from the stud in the end position.

2. The rear wall connector according to claim 1, wherein the angle through which the inside of the second wall is positioned obliquely outwards with respect to the longitudinal center plane of the receiving groove in the starting position is in the range of 10° to 25°.

3. The rear wall connector according to claim 1, wherein the stud and/or the lower rocker arm each have at least one projection on their outsides.

4. The rear wall connector according to claim 1, wherein the opening of the first wall is formed by two mutually overlapping openings arranged above one another, in the form of an upper pre-assembly channel and a lower end position channel.

5. The rear wall connector according to claim 4, wherein the upper pre-assembly channel is directed towards the opening of the second wall in the starting position.

6. The rear wall connector according to claim 4, wherein the two overlapping openings of the first wall are surrounded on the outside by a cone surface arranged concentrically to the lower end position channel.

7. The rear wall connector according to claim 1, wherein a screw is screwed into the opening of the first wall.

8. An arrangement comprising two mutually connected panels of which a first one of the panels is inserted into a groove of a second one of the panels and the rear wall connector according to claim 1, wherein the rear wall connector is inserted with its stud into a bore arranged in the groove of the second panel and is deflected into its end position, wherein the first panel, which is inserted into the receiving groove of the rear wall connector, is clamped between the two walls of the rear wall connector and is screwed in place by means of a screw which is screwed through the rear wall panel via the opening of the first wall and into the opening of the second wall.

9. The rear wall connector according to claim 1, wherein the angle through which the inside of the second wall is positioned obliquely outwards with respect to the longitudinal center plane of the receiving groove in the starting position is in the range of 15° to 20°.

10. The rear wall connector according to claim 1, wherein the stud and/or the lower rocker arm each have a plurality of projections on their outsides.

* * * * *